March 9, 1954 — W. R. JOHNSTON — 2,671,358
POSTIVE DRIVE NONSPIN DIFFERENTIAL FOR MOTOR VEHICLES
Filed July 29, 1952 — 2 Sheets-Sheet 1

Inventor
William R. Johnston
By Wooster & Davis, Attorneys

March 9, 1954  W. R. JOHNSTON  2,671,358
POSTIVE DRIVE NONSPIN DIFFERENTIAL FOR MOTOR VEHICLES
Filed July 29, 1952  2 Sheets-Sheet 2

INVENTOR
William R. Johnston
BY
Wooster & Davis
ATTORNEYS.

Patented Mar. 9, 1954

2,671,358

UNITED STATES PATENT OFFICE 2,671,358

POSITIVE DRIVE NONSPIN DIFFERENTIAL FOR MOTOR VEHICLES

William R. Johnston, New Milford, Conn.

Application July 29, 1952, Serial No. 301,483

8 Claims. (Cl. 74—711)

1

This invention relates to a differential drive for motor vehicles, and has for an object to provide a positive drive, non-spin differential for said vehicles. In other words, it is an object to provide a differential which will permit the wheels to turn at different speeds, but which will not permit one of the wheels to spin when off the ground while the other wheel is on the ground, or permit one to slip on a slippery surface while the other has frictional or driving contact with a surface.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figures 1, 2:
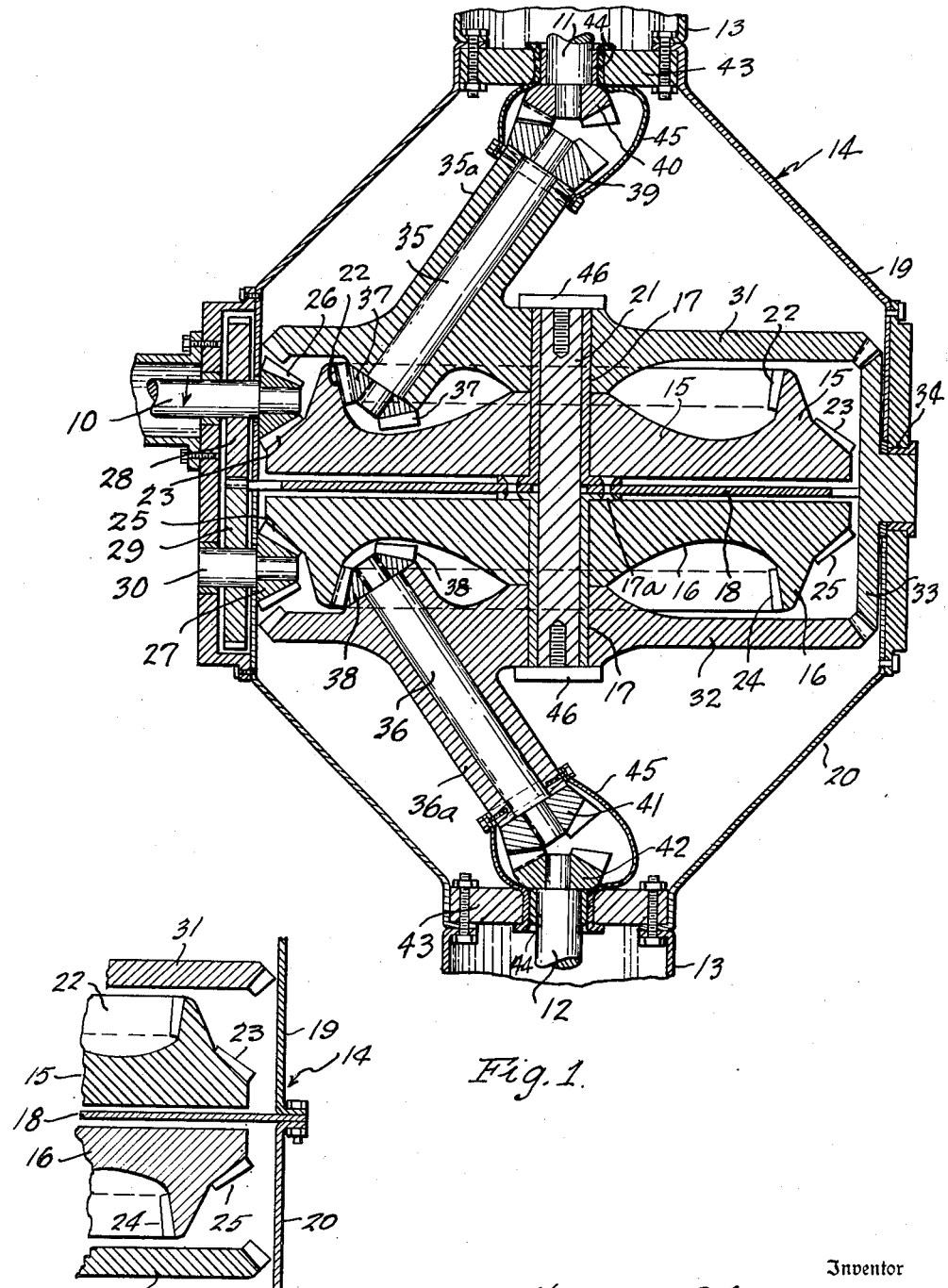
Figure 3:
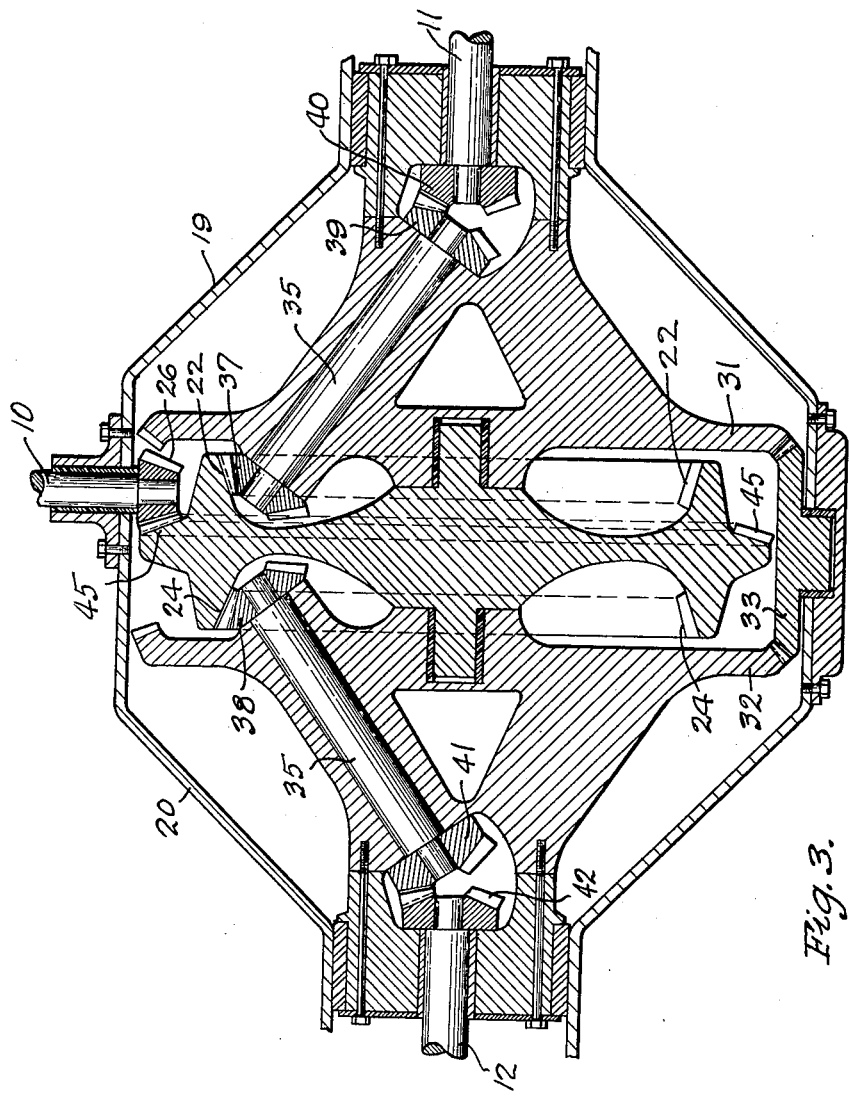

In this drawing:

Fig. 1 is a longitudinal section showing one embodiment of this improved differential, Fig. 2 is a detail section at one side thereof, and Fig. 3 is a section similar to Fig. 1 showing a modified construction.

In the drawing the device is shown somewhat diagrammatically without showing all the details. It comprises the usual drive shaft 10 connected to the motor through the usual gearing and clutch means (not shown), and the two axle shafts 11 and 12 connected one to each of the rear wheels (not shown) of the vehicle in the usual manner and enclosed in the usual rear axle housings 13 with an intermediate enlarged housing 14 enclosing the differential gear mechanism. This comprises a pair of gears 15 and 16 located between and in axial alignment with the axle shafts 11 and 12. These gears may be mounted in any suitable manner, but are shown as mounted on sleeve bearings 17 mounted on a central wall 18, by any suitable means as rivets or bolts 17a, fastened between the sections 19 and 20 forming the housing 14. A shaft 21 may be mounted in the sleeves 17 to strengthen and help support them. The gears 15 and 16 are really double gears each including an internal gear and an external gear, the internal gear for 15 being shown at 22 and the external gear at 23, while the internal gear of gear 16 is shown at 24 and the external gear at 25. A pair of drive pinions 26 and 27 each mesh with one of the external gears 23 and 25 respectively, and these pinions are connected with the drive shaft 10 so as to be driven thereby. The gears 23 and 25 are of the same diameter and number of teeth and the two

2 pinions 26 and 27 are the same size and are driven at the same speed so that the two gears 15 and 16 are driven at the same speed. For this purpose pinion 26 is mounted on the shaft 10, while the pinion 27 is connected with the shaft so as to be driven thereby through a pair of meshing spur gears 28 and 29, gear 28 being on the drive shaft 10 and the gear 29 being on a short shaft 30 on which the pinion 27 is mounted.

Mounted on the bearing sleeves 17 on opposite sides of the gears 15 and 16 and between each of these gears and the adjacent axle shaft 11 or 12 is mounted a differential gear wheel 31 and 32 respectively, shown as bevel gears, and these gear wheels are connected by an intermediate bevel gear 33 mounted in a suitable bearing 34 in the housing and meshing with the gears 31 and 32 to form a driving connection between them and so that these gear wheels rotate in opposite directions. Carried by each of the gear wheels 31, 32 is a planetary shaft 35 and 36 respectively, the shaft being located to one side of the aligned axes of the gears 15, 16, gear wheels 31 and 32, and the axle shafts 11 and 12, so that when gears 31 and 32 rotate these shafts are carried bodily about the axis of the gear wheel. In the arrangement shown these shafts are inclined to the axis of the gear wheels, and at their inner end or the end more removed from the axis each carries a pinion 37 and 38 respectively meshing with the internal gears 22 and 24 respectively, and the opposite end of these inclined shafts has a driving connection with the adjacent axle shafts 11 and 12 respectively, in the arrangement shown by means of bevel gears 39, 40, and 41 and 42. The axle shafts 11 and 12 are mounted in the conventional bearing in the housing members 13, 14, the drawing showing merely a supporting member 43 with a sleeve bearing 44. The bevel gear drive 39, 40, 41 and 42 may each be enclosed in a sort of cage arrangement 45 mounted on the bearings 35a and 36a for the shafts 35 and 36 and steadied by bearings 43. They help hold the gears in mesh and are open on opposite sides for entrance of lubricant to the gears, it being understood the housing, particularly the central section 14, is filled with suitable lubricant, such as oil or grease. The gears 39, 40 and 41, 42 preferably have eight teeth each. Gears 37 and 38 may have 8, 12 or 16 teeth as desired, and gears 22 and 24 may have 32 teeth each. The gear wheels 31 and 32 may be retained on the bearing sleeves 17 by any suitable means such, for example, as the headed screws 46.

In operation, if we assume the drive shaft 10 is rotated counterclockwise or in the direction of the arrow, then the pinion 26 will rotate in the same direction and the pinion 27 in the opposite direction, and as they mesh with the external gears 23 and 25 they will rotate the two gears 15 and 16 to the left or counterclockwise and will rotate the two shafts 35 and 36 by the internal gears 22 and 24 meshing with pinions 37 and 38, and these shafts in turn will rotate the axle shafts 11 and 12 counterclockwise to rotate the wheels (not shown) forwardly. If the car is moving forwardly in a straight line the two axles 11 and 12 will rotate at the same speed and the two gear wheels 31 and 32 will remain stationary. If now one of the wheels, and therefore its axle shaft, turns faster or slower than the other axle shaft (for example, if the axle shaft 11 turns faster or slower than the axle (12) it will turn the shaft 35 either faster or slower, and with it the pinion 37, so that this pinion moves around the gear 22. (As the two gears 15 and 16 are geared to driving shaft 10 and are driven at the same speed, they may be considered as stationary for this purpose.) This will turn the differential gear wheel 31 in one direction or the other, depending on whether shaft 11 is going faster or slower than shaft 12, and through the connecting gear 33 will turn the other differential gear wheel 32 in the opposite direction, and this wheel will carry with it the shaft 36, causing the pinion 38 to move around the internal gear 24 giving the differential action. Thus, if the axle shaft 11 should tend to rotate faster than axle shaft 12, this action would be permitted by the relative movement between the gear wheels 31 and 32 tending to move in opposite directions relative to the two gears 15 and 16 which are rotating forwardly in the same direction and at the same speed. As the two gears 15 and 16 are both geared to and are driven by the drive shaft 10 at the same speed, they are in effect a unitary gear means and they could be formed as a single gear as shown in Fig. 3 comprising, for example, the two internal gears 22 and 24 and the single external gear 45 corresponding to gear 23 driven by the single pinion 26 on the drive shaft 10, or they could be connected and driven by the single pinion 26.

With the above arrangement there is always a positive drive on the drive shaft to each axle shaft, and each wheel must make the same number of turns for each revolution of the gears 15 and 16 when the differential gear wheels 31 and 33 are stationary. Neither wheel can spin when off the ground while the other wheel is on the ground.

Having thus set forth the nature of my invention, I claim:

1. A differential comprising a drive shaft, a pair of aligned axle shafts, a pair of gears side by side between the axle shafts, each gear being provided with two sets of teeth, a pair of pinions meshing one with each gear, one pinion being on the drive shaft and the other geared to it so that the pinions rotate relative to each other, a gear wheel located between each gear and the adjacent axle shaft, a gear meshing with and connecting the gear wheels, a shaft mounted on each gear wheel inclined to the axis of said wheel, a pinion on one end of each latter shaft meshing with the adjacent gear, and a gear connection from the other end of each inclined shaft to the adjacent axle shaft.

2. A differential comprising a drive shaft, a pair of aligned axle shafts, a pair of coaxial gears between the axle shafts and axially aligned therewith, an axially aligned gear wheel between each gear and the adjacent axle shaft, a gear connection between the two gear wheels, a shaft carried by each gear wheel inclined to the axis of said wheel, a pinion on each inclined shaft meshing with the adjacent gear at one end and each shaft geared to the adjacent axle shaft at its opposite end, and a pair of pinions meshing one with each gear and connected with the drive shaft to be driven thereby.

3. A differential comprising a drive shaft, a pair of pinions driven by said shaft, a pair of aligned axle shafts, a pair of axially aligned double-gears between the axle shafts and meshing one with each of said pinions, a gear wheel between each of said gears and the adjacent axle shaft, a gear connecting said gear wheels, an inclined shaft carried by each gear wheel, and each inclined shaft being provided with a pinion at one end meshing with the adjacent double gear and geared to the adjacent axle shaft at its other end.

4. A differential comprising a drive shaft, a pair of aligned axle shafts, a pair of axially aligned double gears between the axle shafts and each comprising an external and an internal gear, a pair of pinions connected with and driven by the drive shaft and each meshing with one of said external gears respectively, axially aligned gear wheels located one between each double gear and the adjacent axle shaft, an intermediate gear between and meshing with the gear wheels, an inclined shaft carried by each gear wheel, and each inclined shaft provided with a pinion at one end meshing with the adjacent internal gear and geared to the adjacent axle shaft at its opposite end.

5. A differential comprising a drive shaft, a pair of aligned axle shafts, a gear means between the axle shafts including a pair of internal gears, a driving connection from the drive shaft to said gear means, a gear wheel located between the gear means and each axle shaft, a gear connection between the gear wheels, and a planetary shaft carried by each gear wheel and each geared at one end to the adjacent internal gear and at its opposite end to the adjacent axle shaft.

6. A differential comprising a drive shaft, a pair of aligned axle shafts, a gear means between the axle shafts, a driving connection from the drive shaft to said gear means, a gear wheel located between the gear means and each axle shaft, a gear connection between the gear wheels causing them to rotate in opposite directions, and a planetary shaft carried by each gear wheel geared at one end to the gear means and at its other end to the adjacent axle shaft.

7. A differential comprising a drive shaft, a pair of aligned axle shafts, a gear means between the axle shafts, a driving connection from the drive shaft to said gear means, a gear wheel located between the gear means and each axle shaft, a gear connection between the gear wheels causing them to rotate in opposite directions, and a planetary shaft carried by each gear wheel and forming a driving connection between the gear means and the adjacent axle shaft.

8. A differential comprising a drive shaft, a pair of aligned axle shafts, a gear means between the axle shafts, a driving connection from the drive shaft to said gear means, a gear wheel located between the gear means and each axle shaft and axially aligned therewith, a gear connection between and meshing with the gear wheels causing them to rotate in opposite directions, a shaft carried by each gear wheel located laterally of its axis, a pinion connecting one end of each shaft with the gear means, and a driving connection from the other end of each shaft to the adjacent axle shaft.

WILLIAM R. JOHNSTON.

References Cited in the file of this patent

UNITED STATES PATENTS

| Number | Name | Date |
|---|---|---|
| 789,910 | Hill | May 16, 1905 |
| 1,040,443 | Signor | Oct. 8, 1912 |
| 1,305,030 | Tibbetts | May 27, 1919 |
| 1,352,590 | Elbertz | Sept. 14, 1920 |
| 2,139,906 | Molly | Dec. 13, 1938 |